United States Patent Office 2,776,882
Patented Jan. 8, 1957

2,776,882

DECARBURIZING HIGH-CARBON FERROCHROMIUM

Cecil G. Chadwick, Lewiston, N. Y., assignor to Union Carbide and Carbon Corporation, a corporation of New York No Drawing. Application December 19, 1955, Serial No. 553,720

3 Claims. (Cl. 75—28)

This invention relates to a process for decarburizing high-carbon ferrochromium and rendering the decarburized material highly resistant to contamination upon subsequent exposure to air or the atmosphere immediately above the furnace to which the alloy is to be added. The novel product of the process also forms a part of the invention.

In the production of ferrochromium, two methods of manufacture are normally employed to obtain a commercial product. One of these is an electric furnace smelting operation in the molten state, in which the raw materials consist essentially of chrome ore, silicon, and slag-forming constituents. The other is a vacuum furnace operation, in which intimate mixtures of high-carbon ferrochromium and an oxidant are heated and reacted in the solid state. The present invention is concerned with the latter method of preparing low-carbon ferrochromium.

In the vacuum decarburization of high-carbon ferrochromium, carbon removal is based on the reaction between carbon in the high-carbon ferrochromium and oxygen in the oxidant, with the resultant formation of carbon monoxide, and its subsequent removal as a gas from the mixture. It is obvious that in such a process it is not only necessary to provide intimate contact between the reacting particles of the mixture, but also to provide the necessary interstitial space for egress of the reaction gases. It is also obvious that some degree of porosity is therefore inherent in the product.

In many applications, such porosity places a limitation on the usefulness of the product. For example, when utilizing the product as an alloy addition to molten steel in electric steelmaking practice, it is desirable to charge the desired weight of pellets in a large addition to the surface of the bath. In this manner, pellets in the upper layers of the charge are subjected to the heat in the furnace above the bath and are therefore taken into solution more rapidly as the level of the charge recedes to the metal bath. Following this practice, a saving in furnace time of one to two hours per heat has been demonstrated in large-scale alloy steel heats.

While the saving in time is a decided benefit in steelmaking, there is a major disadvantage which precludes using the pellets in the foregoing manner. As previously mentioned, the pelleted low-carbon ferrochromium products heretofore made are inherently porous. Being porous, they are amenable to the absorption of gases, so that with prolonged heating of the pellets in the atmosphere of a steelmaking furnace, there is considerable absorption of nitrogen. This nitrogen combines with the metallics of the pellets and is subsequently transferred to the steel bath as the pellets melt. This often results in excessive nitrogen contamination of the steel. Because of the inherent porosity of the pellets of the prior art it is necessary that their storage, prior to use, be in a dry location in order to minimize absorption of moisture.

Additionally the inherent porosity of the prior art pellets requires that the vacuum furnace be cooled to a temperature low enough to prevent excessive nitrogen contamination when the pelleted product is exposed to the air. This lengthens the furnace cycle and thereby adds to the cost of the product.

The affinity of the porous pellets of the prior art for nitrogen was illustrated by heating representative pellets containing 0.02% nitrogen in air for a short period of time at various temperatures, and analyzing the resultant pellets for nitrogen. The following results were obtained:

| Time | Temperature, ° C. | Percent Nitrogen in Product |
|---|---|---|
| 10 Min. | 1,050 | 0.47 |
| 10 Min. | 1,200 | 2.48 |
| 10 Min. | 1,300 | 3.36 |

Similar tests made with lump low-carbon ferrochromium from a typical smelting operation showed a nitrogen content of only 0.09% after heating at each temperature level. This alloy initially contained 0.03% nitrogen.

To minimize the chances for nitrogen pickup during heating of the pellets in air, it has been suggested that the pellets, after manufacture, be coated with impervious salt compounds or that they be burnished or peened to seal the outer pores of the pellets. Such expedients, in addition to adding to the cost of the product, have not been entirely successful.

The principal object of the present invention, therefore, is to provide a method for the vacuum decarburization of high-carbon ferrochromium by reaction with an oxidant, wherein an effective sealing of the interstitial pores of the product is achieved without blocking the egress of evolved reaction gases.

Further objects and attendant advantages are inherent in the process, and will appear evident from the examples and subsequent disclosure.

The present invention is based on the discovery that the use of an oxidant in combination with slag-forming or gangue constituents expedites the decarburization reaction and, at the completion of the reaction, effectively blocks or seals the pores of the product.

In accordance with the present invention, low-carbon ferrochromium, i. e. ferrochromium having a carbon content of not more than 2%, is prepared by reacting high-carbon ferrochromium with sufficient gangue-containing oxidant, such as iron ore, to contain an excess of that required for the carbon-oxygen reaction at elevated temperatures and subatmospheric pressures. The amount of oxidant may advantageously run up to 30% excess over that required for the decarburizing reaction. The constituents are ground preferably to approximately 300 mesh or less in size and intimately mixed with sufficient binder to allow pressing to the desired shape, i. e. pellets, bricks, and the like. This compacted mixture is dried at approximately 200° C. and placed in a vacuum furnace which is then evacuated to at least 2500 microns of mercury pressure and heated to about 1250° C. The vacuum is then increased to about 75 microns of mercury and maintained at that level throughout the heat-treatment. Since the ferrochromium-carbon eutectic is 1265° C. at 2.72% carbon, the compacts should be allowed to soak at 1250° C. until the carbon content is approximately 2.5%. When this is attained, the temperature is progressively raised, suitably incrementally, to about 1375° C. During the progressive temperature ranges, the reaction reduces the carbon content well below the 2% level to about 1.0%, 0.1%, and, finally, to the desired level of approximately 0.01%. The product is then cooled under vacuum or inert gas.

In the practice of the process of the invention, careful control of the reaction temperature is necessary to maintain the slag-like constituents in a semifluid state such that carbon monoxide, evolved throughout the pellet, is able to find a free path to the surface of the pellet until the reaction is completed. The gangue constituents do not appear to enter the reaction but only serve to form this incipiently fused mass between adjoining particles of high-carbon ferrochromium during the progress of the decarburization reaction. If proper control of temperature is not maintained, the slag-like material will coalesce early in the reaction and be exuded as beads on the surface of the pellet. It is important that the reaction temperature be controlled below the temperature at which the high-carbon ferrochromium will fuse during the reaction. However, at the completion of the reaction, and with low-carbon ferrochromium as the product, it is preferred that the temperature of the pellets be increased to further fluidize the slag-like material in the pores of the pellets, and thus obtain more effective sealing in the final product.

The amount of gangue-containing oxidant in the mixture is, of course, determined by the carbon content of the high-carbon ferrochromium, it being merely necessary to compute the amount of oxygen necessary to decarburize the ferrochromium and then to ascertain the quantity of ore required to provide the excess.

In addition to iron ore, other natural ores containing the gangue constituents, such as manganese, chromium and nickel ores, are adaptable to the practice herein described. Also suitable as the oxidant is oxidized high-carbon ferrochromium. If the oxidant contains no silica or an insufficient amount to seal the pores of the pellets, silica may be added as a separate component of the mixture. Silica might be present in such quantities as to supply oxygen as well as the slag.

To illustrate the sealing action obtained in accordance with the method of the invention, pellets were made from a mixture of comminuted high-carbon ferrochromium and iron ore. These were heated in vacuum under controlled temperatures as described above. The low-carbon ferrochromium pellets were heated in air at elevated temperatures and their nitrogen content determined as follows:

| Time | Temperature, °C | Percent Nitrogen in Pellets |
| --- | --- | --- |
| 10 Min | 1,050 | 0.01 |
| 10 Min | 1,200 | 0.025 |
| 10 Min | 1,300 | 0.055 |

In each case the original nitrogen content of the pellets was 0.01%.

Pellets made according to the process of the invention can be distinguished from the pellets of the prior art by both the sealing materials in the pores of the pellet and the density of the pellet. Pellets made according to the process of the invention will exhibit an apparent density of 6.5 to 7.0, as determined by immersion of a paraffin-coated sample in water.

The importance of a dense product is reflected in lower costs both for shipment and storage of the product. The bulk density of pellets heretofore manufactured is reported as 156 pounds per cubic foot. The bulk density of similarly-shaped pellets made in accordance with the method of the invention is 223 pounds per cubic foot. Obviously, fewer containers will be required to ship the latter material and, for a given weight, storage space and bulk material handling will be considerably less.

Another advantage from the addition of slag-forming constituents to the principal oxidant is that a minimum of additional fluxes is required in the steelmaking operation when using the materials of the invention.

A further advantage which accrues from the addition of slag-forming constituents to the principal oxidant in the present vacuum decarburization process, is that the intimate physical contact heretofore required between reactants in the mixture, and obtained by pelleting, is not so important. This has been demonstrated by lightly ramming a mixture of comminuted high-carbon ferrochromium and iron ore into block form approximately six inches wide by eight inches long by eight inches thick and heating in vacuum at reaction temperatures. No difficulty was experienced in decarburizing such a mixture to an average carbon level of 0.02%.

Typical analyses of iron ores that have been used in forming the pellets according to the process of the invention are as follows:

*Fisher Hill iron ore concentrates*

|  | Percent |
| --- | --- |
| $Fe_3O_4$ | 92.60 |
| $SiO_2$ | 5.00 |
| C | 0.08 |

*Chateaugay iron ore*

|  | Percent |
| --- | --- |
| $Fe_3O_4$ | 88.21 |
| $SiO_2$ | 7.40 |
| $P_2O_5$ | 0.03 |

*Sibley iron ore*

|  | Percent |
| --- | --- |
| $Fe_2O_3$ | 97.55 |
| Si | 1.31 |
| P | 0.36 |

What is claimed is:

1. A process for decarburizing ferrochromium which process comprises blending comminuted, carbon-containing ferrochromium and comminuted iron ore, said iron ore being present in a quantity in excess of that required to supply oxygen for reaction with the carbon in said ferrochromium, forming pellets of the blended comminuted materials, heating said pellets at a pressure of less than atmospheric and at a temperature which is below the melting point of said pellets and high enough to effect a reaction between the carbon in said ferrochromium and the oxygen in said iron ore, raising the temperature of said pellets incrementally as the carbon content of said pellets is decreased and heating said pellets at a temperature of at least about 1375° C. to fuse the gangue present in said iron ore.

2. A pocess for decarburizing ferrochromium which process comprises blending comminuted iron ore and ferrochromium which contains carbon in an amount equal to at least 2%, said iron ore being present in a quantity in excess of that required to supply oxygen for reaction with the carbon in said ferrochromium, forming pellets of the blended comminuted materials, heating said pellets at a pressure of less than atmosheric and at a temperature of about 1250° C., further heating said pellets, while maintaining said pellets in a solid state, at a pressure of about 75 microns of mercury pressure and at a temperature greater than 1250° C. whereby carbon in said ferrochromium is oxidized, and, after the removal of carbon from said pellets in the form of evolved gas, fusing the gangue constituents of said pellets.

3. An alloy addition agent comprising pellets of low-carbon ferrochromium having a carbon content of less than 2%, said pellets comprising particles of ferrochromium bonded together and containing in the interstices between particles fused gangue material from iron ore, said pellets having an apparent density of at least 6.5.

No references cited.